(12) United States Patent
Harbin

(10) Patent No.: US 6,405,641 B1
(45) Date of Patent: Jun. 18, 2002

(54) COOKWARE FOR VERTICAL HEARTH BARBECUE GRILL

(76) Inventor: Lawrence Harbin, 2906 Maplewood Pl., Alexandria, VA (US) 22302

( * ) Notice: Subject to any disclaimer, the term of this patent is extended or adjusted under 35 U.S.C. 154(b) by 0 days.

(21) Appl. No.: 09/630,138

(22) Filed: Aug. 1, 2000

(51) Int. Cl.[7] ................................................ A47J 37/00
(52) U.S. Cl. ........................... 99/339; 99/340; 99/422; 99/401; 99/403; 99/449
(58) Field of Search ......................... 99/393, 401, 426, 99/447, 449, 403, 339, 340, 389, 422; 126/9 R, 9 A, 25 R, 26, 373.1; 220/573.1, 912

(56) References Cited

U.S. PATENT DOCUMENTS

| | | | | |
|---|---|---|---|---|
| 2,432,792 A | * | 12/1947 | Ovenshire | 99/422 |
| 3,140,651 A | * | 7/1964 | Barnett | 99/339 |
| 3,276,351 A | * | 10/1966 | Sundholm | 99/339 |
| 3,742,838 A | * | 7/1973 | Luschen et al. | 99/389 |
| 4,619,190 A | * | 10/1986 | Smith | 99/393 |

\* cited by examiner

Primary Examiner—Reginald L. Alexander
(74) Attorney, Agent, or Firm—McIntyre Harbin & King

(57) ABSTRACT

A cooking container such as a pot, skillet or deep fryer is geometrically shaped to lie upon and to optimally extract heat from the firebox of a vertical hearth barbecue grill. The container has a bottom heat extraction surface that lie directly over the fuel source and that spans horizontally across the top portion of the firebox to receive direct convection heating. The container hooks onto a frontal surface of the firebox and includes a heat transfer/absorbing panel that is inclined according to any inclination of the firebox to receive at least a combination of direct convection and radiant heating, e.g., direct and indirect heating. A layer of copper may be placed on or embedded within the side and bottom panels of the container to disperse heat more evenly. Heat transfer surfaces of the container may be corrugated or otherwise expanded in area to enhance extraction of heat from the source.

9 Claims, 6 Drawing Sheets

COOKWARE FOR VERTICAL HEARTH BARBECUE GRILL

BACKGROUND OF THE INVENTION

The present invention relates to cookware, but more specifically to cooking containers such as pots, pans, skillets, deep fryers, and the like specially adapted for use with a vertical hearth barbecue grill such as that, for example, shown by commonly owned U.S. Pat. No. 5,823,174 and U.S. patent application Ser. No. 09/332,903, each of which being incorporated herein.

SUMMARY OF THE INVENTION

In accordance with one aspect of the invention, a side-hanging cooking container is provided for use with a generally vertically positioned firebox of a vertical hearth barbecue grill, wherein the container comprises an open top that is elongated laterally across an upper portion of said firebox; a heat absorbing panel extending downwardly from said open top in a mating relationship with a heat emitting face of the firebox; a rear panel opposite said heat transfer surface, opposed side panels connecting said rear and heat transfer surfaces; and a bottom panel that enclose bottom edges of the heat absorbing, rear, and opposed side panels.

In accordance with another aspect of the invention, a top-mounted elongated cooking container is provided for use with a vertical hearth barbecue grill having a bottom heat absorbing panel extending across the top of said firebox and upwardly extending sidewalls of various heights thereby to form a cooking container that optimally extracts direct heat from burning fuel in the firebox.

Other aspects of the invention are pointed out with particularity by the appended claims.

DESCRIPTION OF ILLUSTRATIVE EMBODIMENTS

Figure 1:
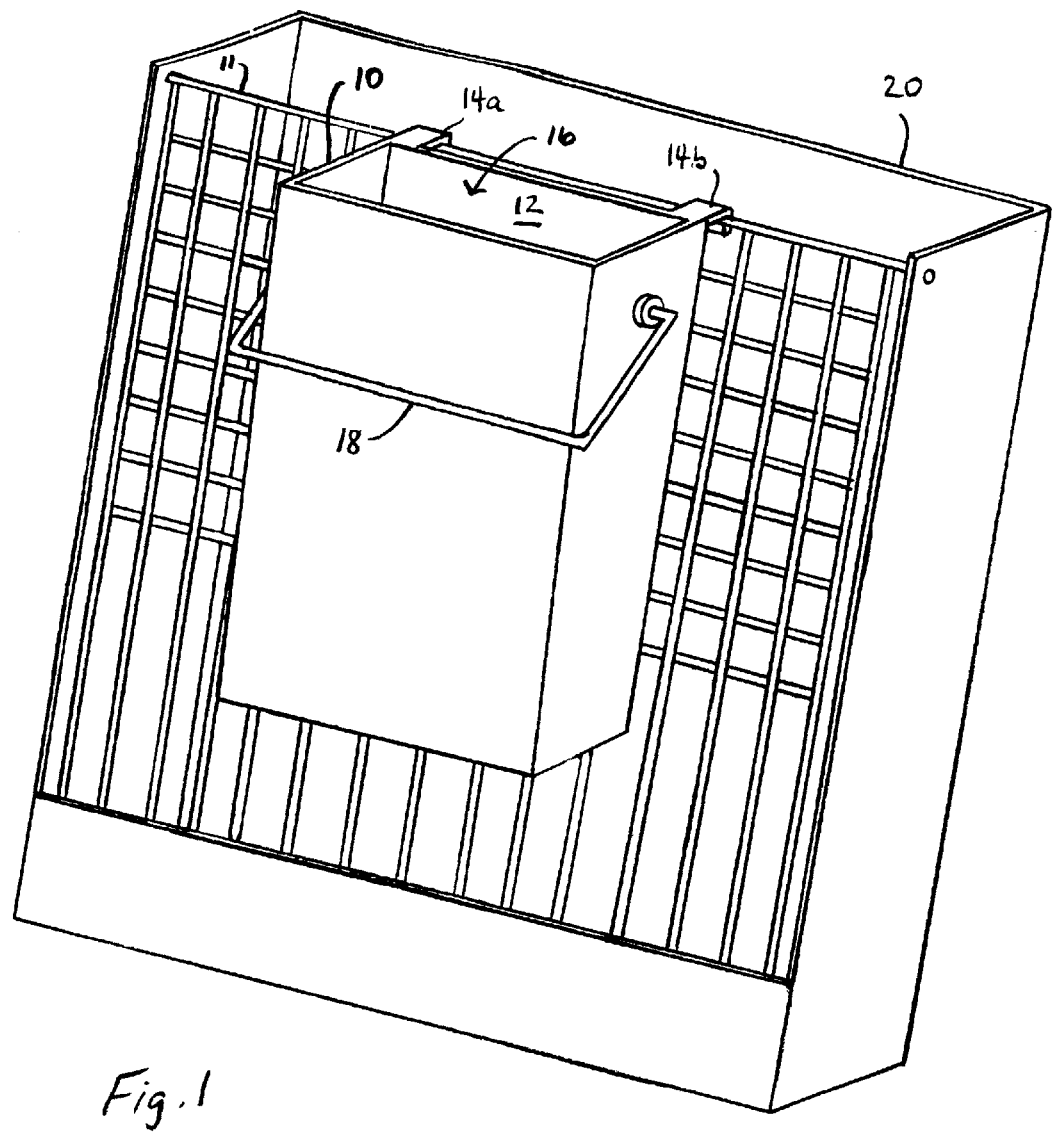
FIG. 1 is a perspective view of an inclined firebox and side-hanging or side-mounted cooking container according the present invention.

A vertical hearth barbecue grill is described in U.S. application Ser. No. 09/332,903, and includes a firebox that is vertical or inclined ten to fifteen degrees from vertical. FIG. 1 shows an exemplary cooking container or cookware 10 which is specially constructed to be use with a firebox 20. Such cooking container or cookware may comprise a pot, fryer or the like, and is geometrically shaped according to the shape of the firebox in order to efficiently extract heat from the fuel source. Container 10, for example, serves as a deep fryer having heat absorbing panel 12 that lies in facing contact, or nearly in facing contact, for receiving heat from a fuel source within firebox 20. The firebox may have an inclination between zero and thirty to forty degrees, but preferably between ten and fifteen degrees from vertical. Deep fryer 10 spans laterally across the face of the inclined firebox and includes a bottom panel, rear panel and opposed side panels. In the embodiment shown, the inclination of panel 12 corresponds with the inclination of firebox 20, e.g., ten to fifteen degrees (more or less). In other embodiment, inclination may range from zero to as much as thirty to forty degrees.

Appendages 14a and 14b of the container engage a supporting rod 11 or similar element of the firebox so as to support the container in facing relation therewith. Instead of providing appendages other supporting structure, such as a receptacle or cradle of the firebox may support the container in facing relation. Handle 18 provides a convenient way of lifting the container away from the firebox. Such a container or fryer may have varying depths to accommodate cooking use.

Figure 2:
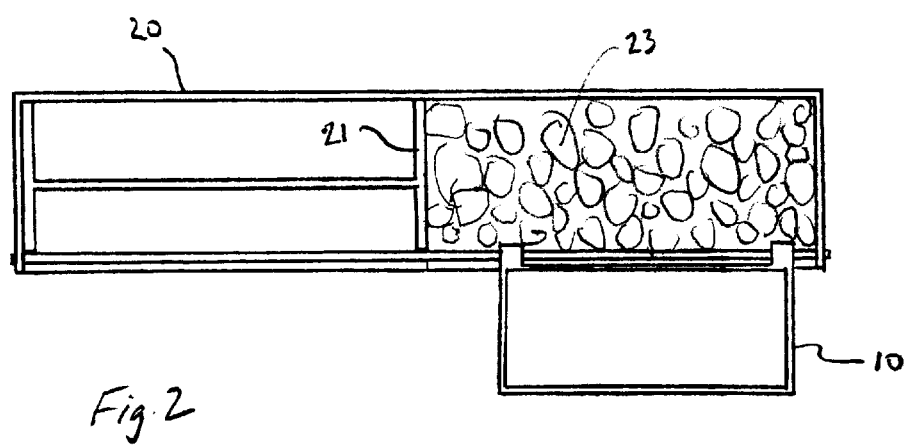
FIG. 2 is a top plan view depicting a cooking container resting on a half-portion of a firebox in accordance with another aspect of the present invention.

In FIG. 2, a partition 21 divides the firebox 20 into two compartment so as to conserve fuel 23 when only a portion of the firebox is required, in which case the container 10 would lie on one side of the firebox, as shown. In one embodiment, the container 22 spans about one-half the width of the firebox and the inside partition segments regions of the firebox that hold briquettes or gas burner(s) when only one container is used for cooking foodstuffs. The inside partition 21 may comprise a sheet metal plate or a grate.

Figure 3:
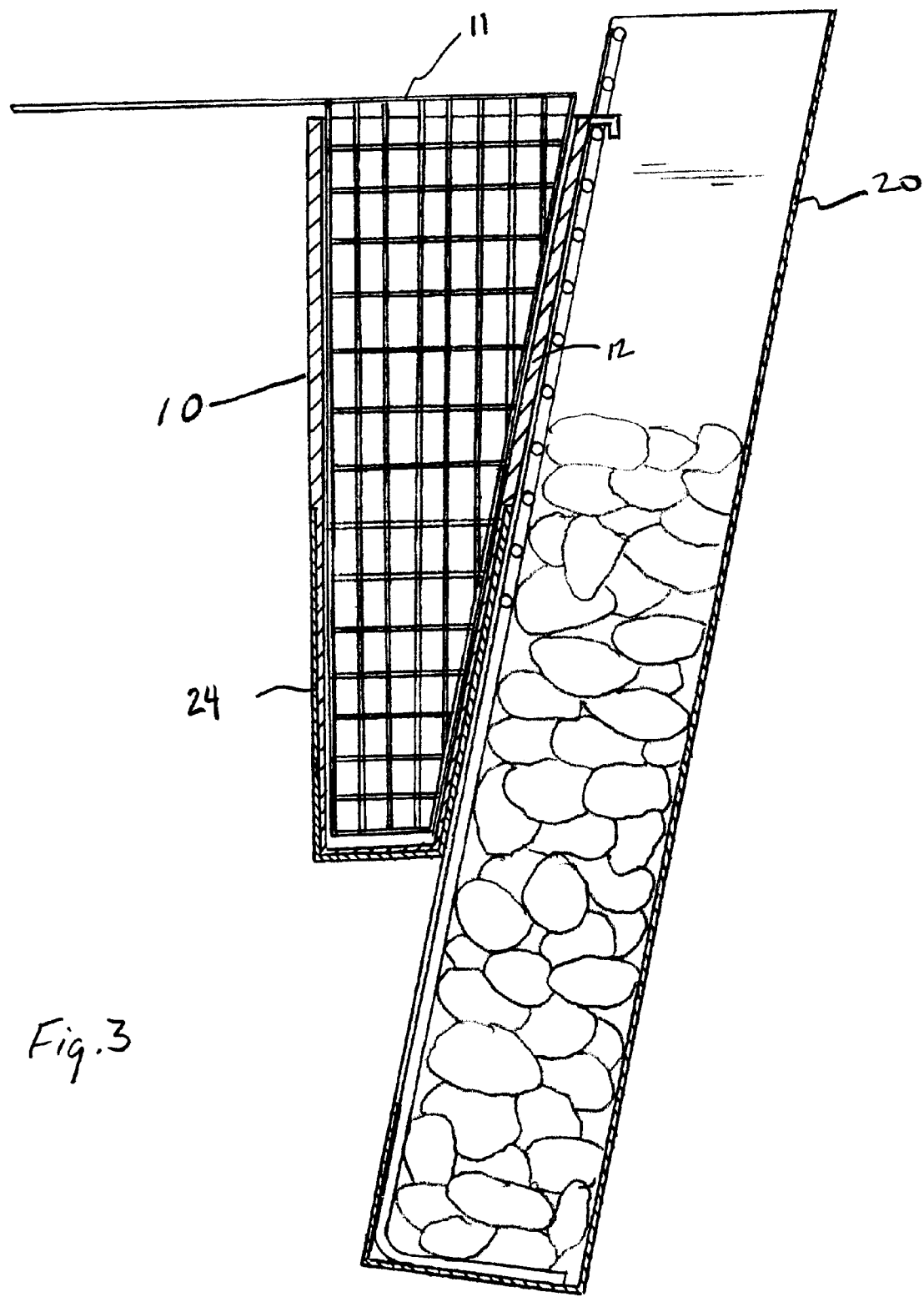
FIG. 3 is a side cut-a-away view of an inclined firebox, cooking container, and wire basket and also depicts additional layering of a material, e.g., cooper, over, under, or sandwiched between a steel or iron panel, which material has high thermal transmissivity characteristics to improve thermal transfer throughout the cooking container

FIG. 3 shows a container 10 that includes a layer 24 of material, e.g., copper, having a high coefficient of thermal transfer that is integrated or formed with panel 12 of container 10. As shown, layer 24 wraps around the bottom portion of container 10, extending to other panels or surfaces of the container 10. In particular, a cast iron or steel container 10 may include a copper layer contiguous with the panel in facing relation to the heat source and extending to the bottom, sides and opposed panels of the cooking container 22. Layer 24 may also be sandwiched between double iron/steel panels of the container, or may comprise an inside layer of the container.

Figure 4C:
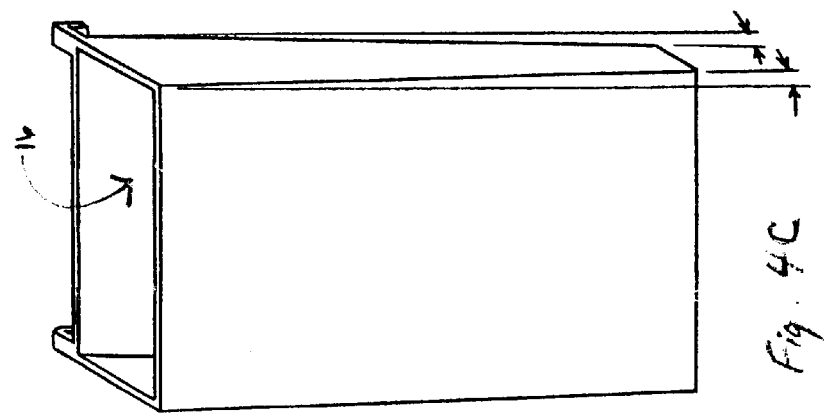
FIGS. 4A, 4B, and 4C illustrate other shapes for the cooking container of FIG. 1.
Figure 4B:
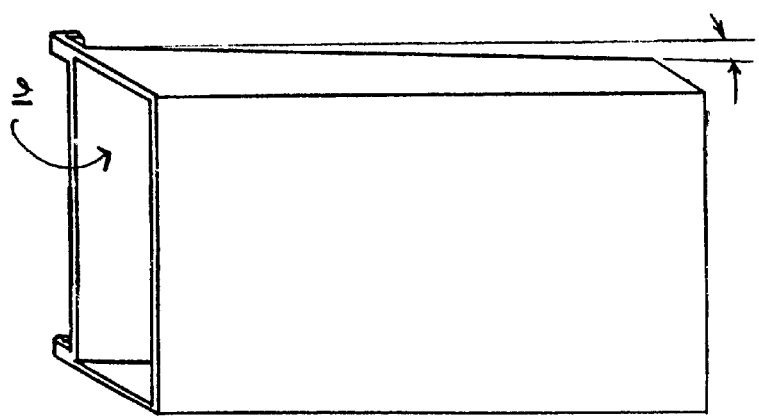
Figure 4A:
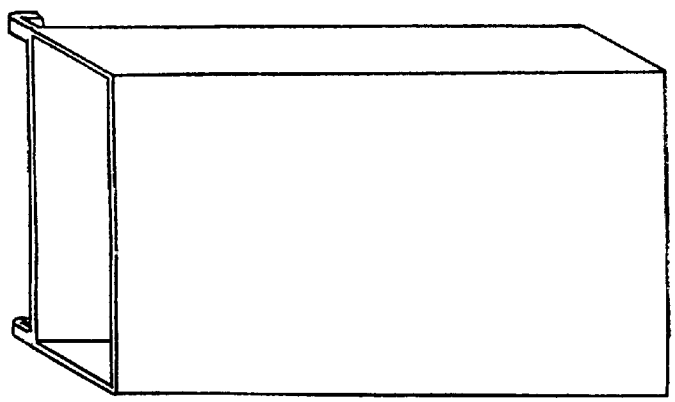

Side-hanging or side-mounted containers may take on a variety of forms, such as shown in FIGS. 4A, 4B, and 4C which have, respectively, polyhedral, wedge-shaped (trapezoidal cross-section), and symmetric wedge-shaped (trapezoidal cross-section) geometries. A container having the shape generally shown by FIGS. 4B and 4C is adapted for use with an inclined firebox whereas a container having the shape of FIG. 4A is more suited for a firebox having zero inclination. As seen, tapered wedge-shaped containers of FIGS. 4B and 4C enable a wider opening 16 at the top for inserting and removing foodstuffs. Further, a similarly shaped wire basket may be used with any of these shapes to assist submersion and removal of foodstuffs for deep frying.

Figure 5C:
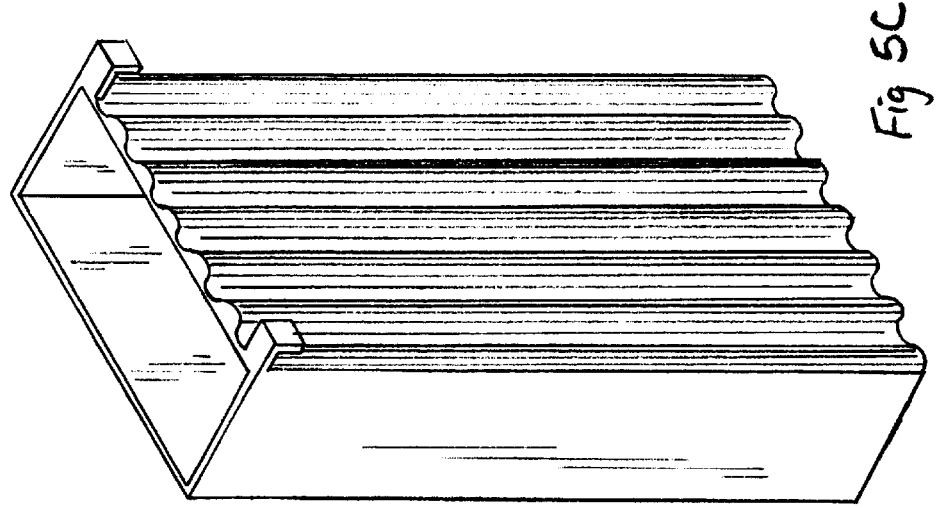
FIGS. 5A, 5B, and 5C shows various constructions for a heat absorbing panel of the cooking container to improve heat transfer capabilities.
Figure 5B:
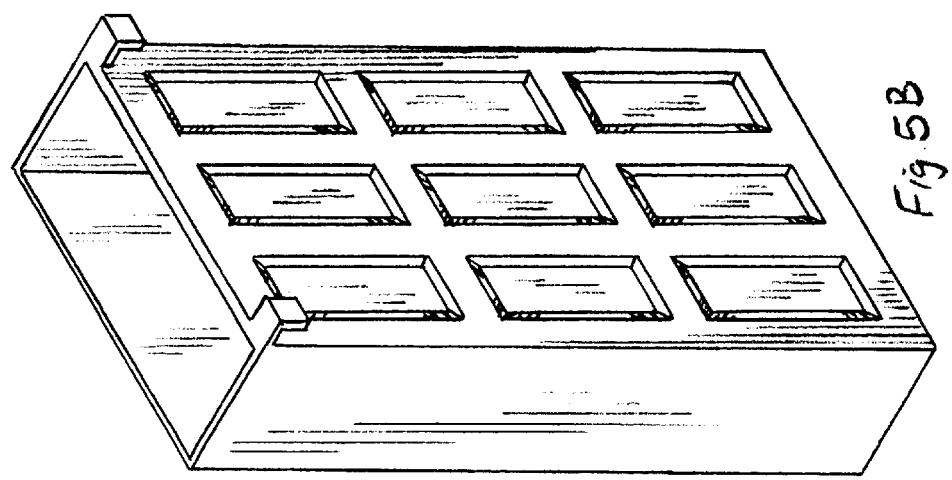
Figure 5A:
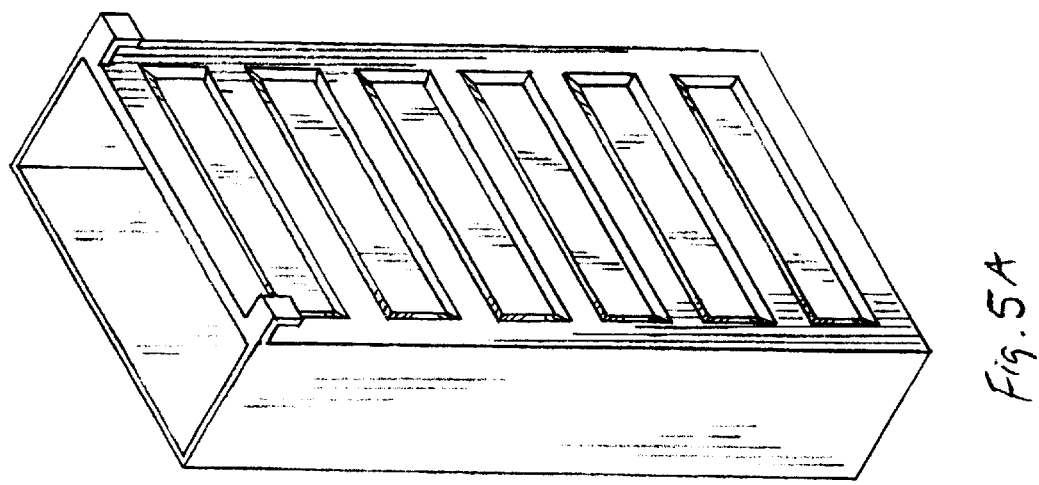

To improve heat transfer or absorbing panel 12 of container 10 may be corrugated or may have an egg crate form such as shown by FIGS. 5A, 5B, or 5C.

Figure 7:
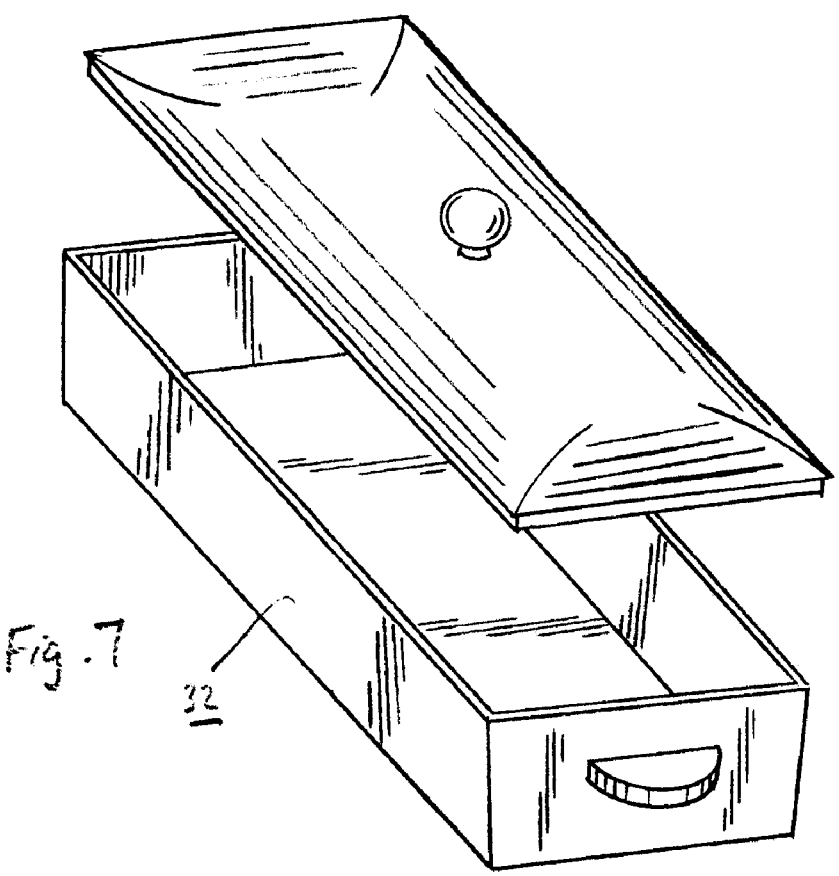
FIG. 7 shows another cooking container for use on top of a firebox.
Figure 6:
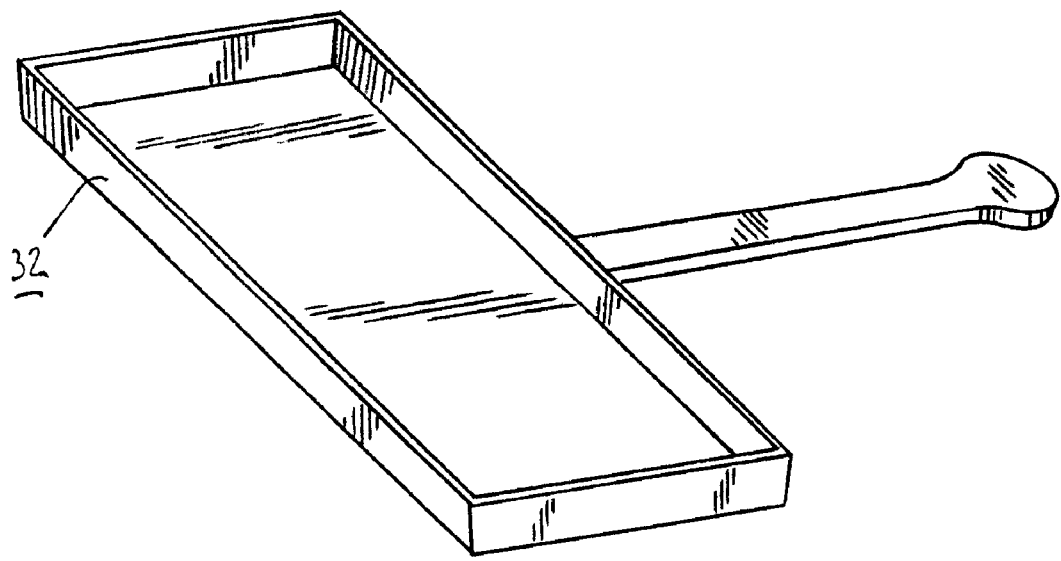
FIG. 6 shows a cooking container, such as a shallow skillet, for use on top of a firebox.
Figure 8:
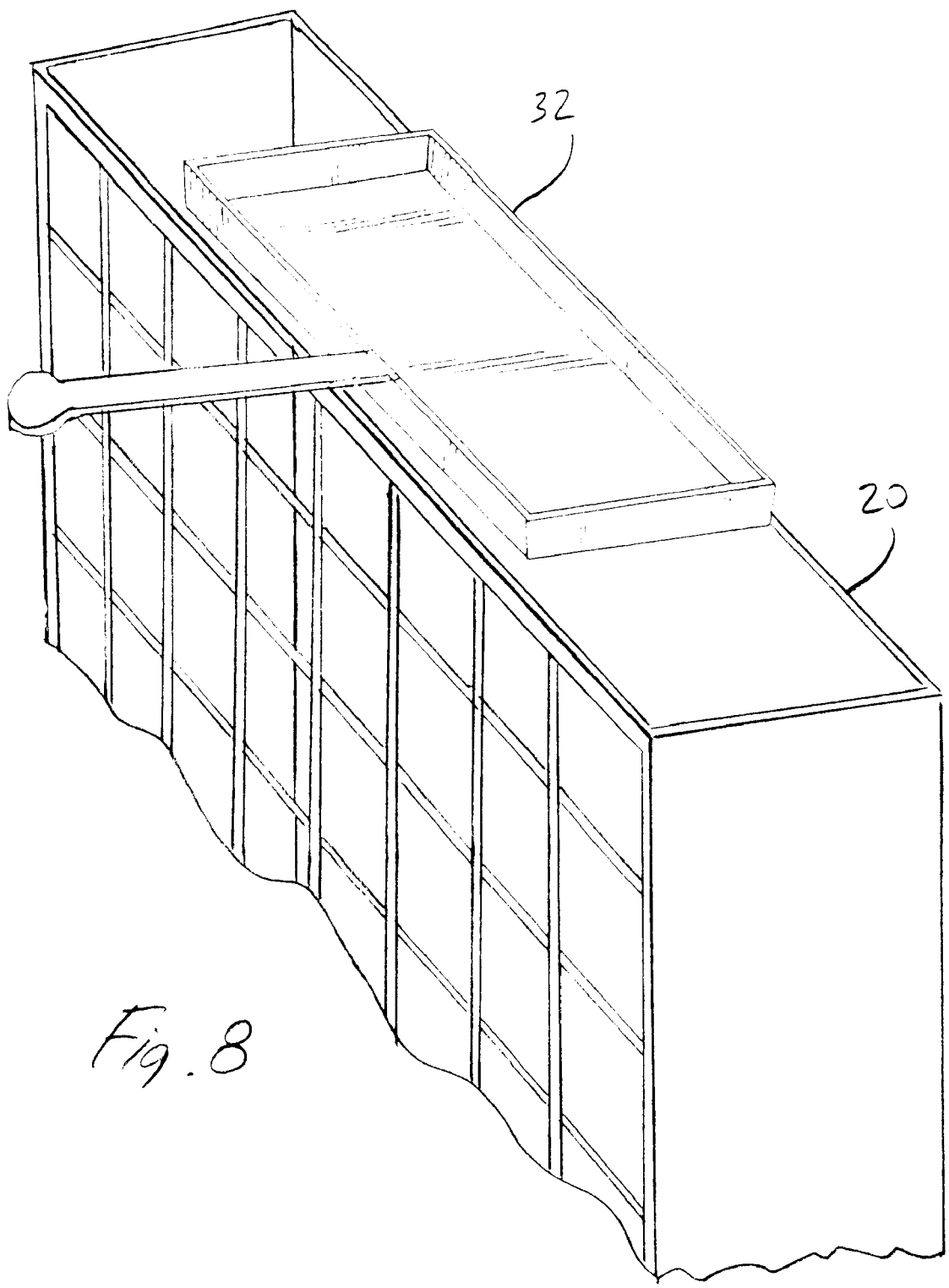
FIG. 8 illustrates a relationship between a cooking container and a firebox according to an aspect of the present invention.

FIG. 6 shows a shallow cooking container or skillet that spans across the top of firebox 20 to achieve greater heat transfer than conventional skillets. The depth of side walls 32 may vary thereby forming a pot or pan, for example. FIG. 7 depict shallow pot that may be use on top of a firebox, it being understood that its walls 32 may also vary in height. Such cookware, for example, may be used with the kettle or pot rack shown in U.S. application Ser. No. 09/190,118, which is also incorporated herein by reference. FIG. 8 illustrates a relationship between a cooking container 32 and firebox 20 to achieve good heat transfer.

The cookware described herein is preferably constructed of metal, e.g., steel or iron, but may also comprise porcelain or other material durable under heat exposure.

The present invention is not limited to the specific designs and construction shown or illustrated herein. Variations and modifications to the container as may come to those skilled in the art are also embraced.

Accordingly, I claim:

1. A cooking container for use with a generally vertically positionable firebox of a vertical hearth barbecue grill, said container comprising:

an open top that is elongated laterally across an upper portion of said firebox;

a heat transfer panel extending downwardly from said open top and being positionable in heat exchanging relationship with a heat emitting surface of said firebox;

a rear panel opposite said heat transfer panel;

opposed side panels connecting said rear and heat transfer panels; and a bottom panel interconnecting and enclosing bottom edges of said heat transfer, rear, and opposed side panels.

2. The cooking container as recited in claim 1 adapted for use with an inclined firebox, wherein said heat transfer panel of said container is also inclined to extend substantially in planar relationship with an inclined heat emitting surface of said firebox.

3. The cooking container as recited in claim 2 further including appendages for grasping a cross-member element of said firebox thereby to enable said container to rest against said firebox.

4. The cooking container as recited in claim 2 where said rear panel is inclined outwardly from said heat transfer panel thereby to provide a wider mouth at said open top.

5. The cooking container as recited in claim 2, wherein said heat transfer panel includes a layer of material having a relatively high heat conductance thereby to disperse heat to the panels of said container.

6. The cooking container as recited in claim 2, wherein said panels are elongated from top to bottom thereby to form a deep fryer useful for frying foodstuffs.

7. The cooking container as recited in claim 2, wherein said heat transfer panel and said firebox have a similar angle of inclination.

8. A cooking container for use with a firebox of a vertical hearth barbecue grill wherein said firebox has an elongated open top and said container comprises an elongated heat transfer base that spans in heat exchanging relation with at least a portion of the elongated open top of said firebox, said container further including plural sidewalls extending generally upwardly from said base to form an enclosure for cooking foodstuffs, and said container further including appendages for grasping an element of said firebox for supporting the container thereon.

9. A cooking container for use with a firebox of a vertical hearth barbecue grill where said firebox has an elongated open top and a heat emitting surface, said container being elongated to co-extend with said firebox and comprising a base and plural sidewalls extending generally upwardly from said base to form an enclosure for cooking foodstuffs, said container further including a heat transfer panel being one of said base and a sidewall that is positionable in heat exchanging relation with a least a portion of said firebox, and said container further including appendages for grasping an element of said firebox to support the container thereon.

* * * * *